US008526587B2

(12) United States Patent
Uhler et al.

(10) Patent No.: US 8,526,587 B2
(45) Date of Patent: Sep. 3, 2013

(54) WEB GUIDED COLLABORATIVE AUDIO

(75) Inventors: Stephen A. Uhler, Los Altos, CA (US);
Roger C. Meike, Emerald Hills, CA (US)

(73) Assignee: Oracle America, Inc., Redwood City, CA (US)

( * ) Notice: Subject to any disclaimer, the term of this patent is extended or adjusted under 35 U.S.C. 154(b) by 923 days.

(21) Appl. No.: 12/646,871

(22) Filed: Dec. 23, 2009

(65) Prior Publication Data

US 2011/0150200 A1    Jun. 23, 2011

(51) Int. Cl.
*H04M 3/42*    (2006.01)

(52) U.S. Cl.
USPC ...................................... 379/202.01; 379/158

(58) Field of Classification Search
USPC ............................................ 379/202.01, 158
See application file for complete search history.

(56) References Cited

U.S. PATENT DOCUMENTS

| | | | |
|---|---|---|---|
| 6,564,261 B1 * | 5/2003 | Gudjonsson et al. | 709/227 |
| 2002/0196929 A1 * | 12/2002 | Smith et al. | 379/266.01 |
| 2003/0220964 A1 * | 11/2003 | Geofroy et al. | 709/203 |
| 2005/0262249 A1 * | 11/2005 | Koskelainen | 709/229 |
| 2006/0080344 A1 * | 4/2006 | McKibben et al. | 707/100 |
| 2007/0002779 A1 * | 1/2007 | Lee et al. | 370/260 |
| 2008/0267095 A1 * | 10/2008 | Sekaran et al. | 370/260 |
| 2008/0273079 A1 * | 11/2008 | Campbell et al. | 348/14.08 |
| 2009/0175427 A1 * | 7/2009 | Raniere et al. | 379/93.21 |
| 2009/0296608 A1 * | 12/2009 | Khan et al. | 370/260 |
| 2010/0061539 A1 * | 3/2010 | Cloran et al. | 379/202.01 |
| 2010/0220845 A1 * | 9/2010 | Oliver et al. | 379/202.01 |
| 2012/0221644 A1 * | 8/2012 | Karniely | 709/204 |

* cited by examiner

*Primary Examiner* — William Deane, Jr.
(74) *Attorney, Agent, or Firm* — Osha Liang LLP

(57) ABSTRACT

A system for conducting a conference call based on a community document. The system includes a data network, a first conference client device and a second conference client device communicatively coupled to the data network, wherein the first conference client device is associated with a first user of the conference call and the second conference client device is associated with a second user of the conference call, and a conference server device communicatively coupled to the data network.

20 Claims, 5 Drawing Sheets

WEB GUIDED COLLABORATIVE AUDIO

BACKGROUND

The World Wide Web (or "the Web") is a system of interlinked hypertext documents (i.e., Web pages) accessed via the Internet. With a Web browser, one can view Web pages containing contents such as text, images, videos, and other multimedia contents by accessing these contents using a Universal Resource Locator (URL) and navigating between these contents using hyperlinks. Throughout this paper, the term "document" is used to refer to an information representation including any or all of these contents. Hypertext Transfer Protocol (HTTP) is an application-level protocol used in establishing the Web as a distributed, collaborative, hypermedia information system. A Web server is a computer program that is responsible for accepting HTTP requests from Web clients (i.e., user agents such as the Web browser used by the users) and providing HTTP responses along with data contents, such as the web pages described above. The request from a Web client for accessing a Web page may require authentication before the requested access is allowed. Authentication may involve a request and validation of user name, password, or other user credentials. A computer running the Web server is called a Web server device while a computer running the Web client is called a Web client device.

The telephone is a telecommunications device that is used to transmit and receive sound, for example a conversation between two or more people using the telephones. Most telephones operate through transmission of electric signals over a complex telephone network (e.g., public switched telephone network or PSTN) which allows communication among users with individual telephone numbers. A telephone number is a sequence of numbers used to call from one telephone line to another connected via a telephone exchange (i.e., telephone switch) in a telephone network. Before a telephone call is connected, the telephone number is dialed by the calling party (or Caller) using a telephone keypad, which has essentially replaced the rotary dialer in the original telephone.

Echo cancellation is a technique used in telephony to remove echo from a voice communication in order to improve voice quality of the telephone call. Acoustic echo arises when sound from a loudspeaker (e.g., the earpiece of a telephone handset or a speaker of a speakerphone) is picked up by a nearby microphone in the same room (e.g., the microphone in the very same handset or speakerphone). The problem exists in communication scenarios where there is a speaker and a microphone.

A conference call is a telephone call in which the calling party wishes to have more than one called party listen in to the conversation of the call. The conference calls may be set up either to allow the called party to participate during the call, or to allow the called party to merely listen into the call and cannot speak. Conference calls can be set up so that the calling party calls the other participants and adds them to the conference. In other cases, the participants are able call into the conference, for example by dialing into a special telephone number of a conference bridge that links telephone lines.

Voice over Internet Protocol (VoIP) is a general term for a family of transmission technologies for delivery of voice communications over IP (Internet Protocol) networks such as the Internet. Based on the VoIP technology, voices are transported via the Internet rather than the PSTN. The equivalent in VoIP technology to a telephone exchange in the PSTN is called a VoIP server. The client portion of VoIP technology can be included in a telephone (e.g., VoIP telephone) or a computer (e.g., Skype) as a VoIP client device for making a telephone call. Whether using a telephone or a computer, the telephone numbers are still required in originating an Internet telephone call, which involves conversion of the analog voice signal to digital format and compression/translation of the digital signal into IP packets for transmission over the Internet. The process is reversed at the receiving end. In particular, VoIP systems employ session control protocols to control the set-up and tear-down of calls as well as audio codec's (coder/decoder) which encode speech allowing transmission over an IP network and decode the audio data stream back into the speech at the receiving end.

In summary, whether using the VoIP technologies over a packet switched data network or the traditional telephone transmission over the PSTN network, communicating with remote people using audio requires a considerable amount of initial setup. For example, the simple act of joining a conference call requires finding and dialing the proper phone number, then entering additional information such as the conference ID and password. Additional information is also required to know when the conference is held, who is going to participate, the topic of the meeting, or reference to any required meeting materials or background information. In another example, a simple two party telephone call often requires looking up a 10+ digit telephone number and entering it into the telephone before set up of the audio connection is initiated.

SUMMARY

In general, in one aspect, the invention relates to a system for conducting a conference call based on a community document. The system includes a data network, a first conference client device and a second conference client device communicatively coupled to the data network, wherein the first conference client device is associated with a first user of the conference call and the second conference client device is associated with a second user of the conference call, and a conference server device communicatively coupled to the data network. The conference server device includes a repository storing the community document and a document access configuration record, wherein the document access configuration record comprises a first access privilege status of the first user and a second access privilege status of the second user, respectively, for accessing the community document, a community document server configured to provide, using a data transmission protocol via the data network, the community document to the first conference client device based on a first approval and to the second conference client device based on a second approval, respectively, wherein the community document is provided responsive to the community document server receiving a first request from the first conference client device and a second request from the second conference client device, respectively, to access the community document, an audio server configured to receive, using a voice over data protocol via the data network, a first user audio data stream from the first conference client device and a second user audio data stream from the second conference client device, respectively, wherein the audio server is further configured to selectively dispatch, using the voice over data protocol via the data network, a user specific conference audio data stream to the first conference client device based on the first approval and to the second conference client device based on the second approval, respectively, an audio mixer configured to selectively generate the user specific conference audio data stream from the first user audio data stream and the second user audio data stream based on the first approval and the second approval, and a processor and memory storing instructions, when executed by the processor, having functionalities to receive and authenticate the first request from the first conference client device to generate the first approval, wherein the first request is authenticated based on the first access privilege status and receive and authenticate the second request from the second conference client device to generate the second approval, wherein the second request is authenticated based on the second access privilege status.

In general, in one aspect, the invention relates to a method for conducting a conference call based on a community document. The method steps include receiving and authenticating a first request from a first conference client device for a first approval and a second request from a second conference client device for a second approval, wherein the first request and the second request are for accessing a community document by the first conference client device and the second conference client device, respectively, wherein the first conference client device is associated with a first user of the conference call and the second conference client device is associated with a second user of the conference call, providing the community document, using a data transmission protocol via a data network, to the first conference client device and the second conference client device based on the first approval and the second approval, respectively, receiving, using a voice over data protocol via the data network, a first user audio data stream and a second user audio data stream from the first conference client device and the second conference client device, respectively, selectively combining the first user audio data stream and the second user audio data stream based on the first approval and the second approval to generate a user specific conference audio data stream, and selectively dispatching the user specific conference audio data stream using the voice over data protocol via the data network to the first conference client device and the second conference client device based on the first approval and the second approval, respectively, wherein the first request and the second request are authenticated based on a first access privilege status of the first user and a second access privilege status of the second user, respectively, for accessing the community document.

In general, in one aspect, the invention relates to a method for receiving a conference call based on a community document. The method steps include sending a first request from a first conference client device and a second request from a second conference client device, respectively, to a conference server device, wherein the first request and the second request are for accessing a community document comprised in the conference server device, wherein the first conference client device is associated with a first user of the conference call and the second conference client device is associated with a second user of the conference call, obtaining, from the conference server, a first approval for the first conference client device and a second approval for the second conference client device, respectively, to access the community document when the first request and the second request are authenticated based on a first access privilege status of the first user and a second access privilege status of the second user, respectively, for accessing the community document, accessing the community document, using a data transmission protocol via the data network, by the first conference client device based on the first approval and the second conference client device based on the second approval, respectively, sending, using a voice over data protocol via the data network, to the conference server device a first user audio data stream from the first conference client device and a second user audio data stream from the second conference client device, respectively, and receiving, using the voice over data protocol via the data network, a user specific conference audio data stream by the first conference client device and the second conference client device based on the first approval and the second approval, respectively, wherein the user specific conference audio data stream is selectively generated by combining the first user audio data stream and the second user audio data stream at the conference server device based on the first approval and the second approval.

Other aspects of the invention will be apparent from the following description and the appended claims.

DETAILED DESCRIPTION

Figure 1:
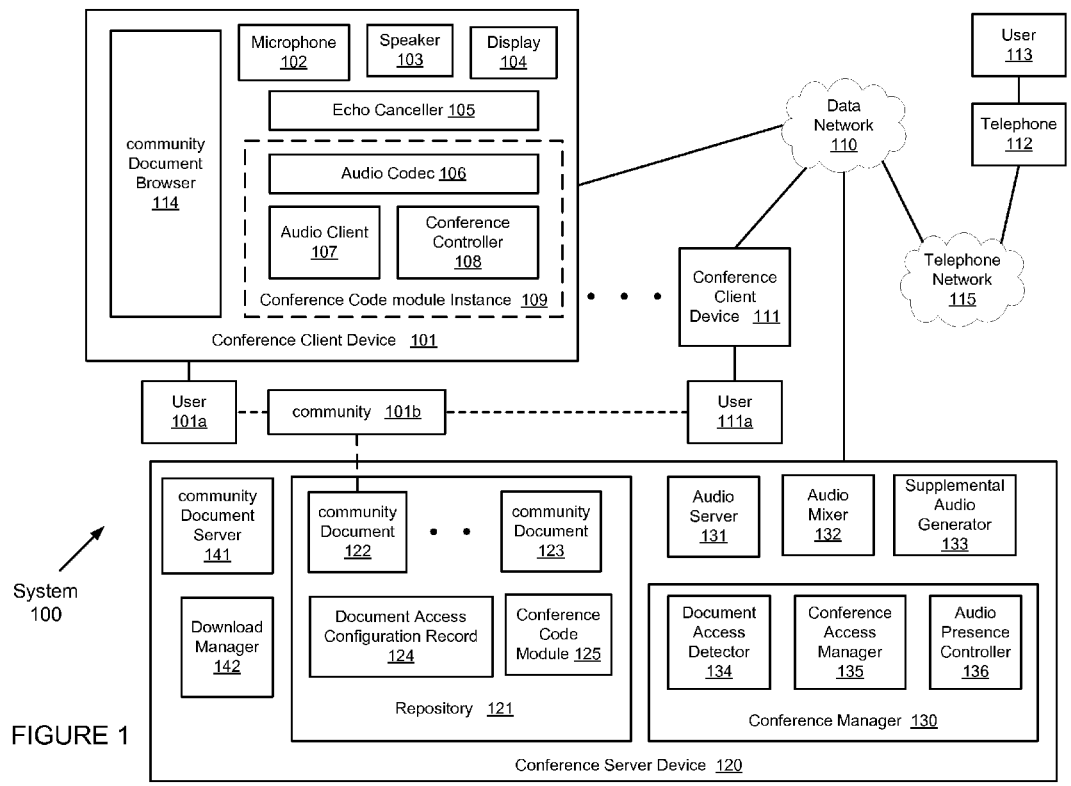
FIG. 1 depicts a block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for simplifying the setup and management portions of an audio interaction among two or more people, or people and computers, such that dialing a telephone number is not required. More specifically, a user joins a conference call by the context of navigating a web document in accordance with one or more embodiments of the invention. Such a conference call is referred to as the Web guided conference call.

FIG. 1 depicts a block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the system (100) includes a conference server device (120), two or more conference client devices (101, 111) associated with two or more users (101a, 111a), a community (101b) to which the users (101a, 111a) participate, and a data network (110). In one or more embodiments of the invention, one or more of the conference server device (120) and conference client devices (101, 111) may comprise a network capable computer (e.g., desktop, laptop, handheld, or other computer type) or other devices with computing capability and network connectivity (e.g., mobile device such as a mobile phone or a personal digital assistant). In one or more embodiments of the invention, the community may be a project group, a social networking contact list, or other types of groups in which members share certain associations.

Further, as shown in FIG. 1, a telephone network (115) and a telephone (112) may optionally be included for those (e.g., user (113)) who do not have other access to (or do not wish to participate in) the Web guided conference call.

In one or more embodiments of the invention, the conference server device (120) further includes a conference manager (130), an audio server (131), an audio mixer (132), a community document server (141), and a repository (121). In one or more embodiments, a download manager (142) and a supplemental audio generator (133) may also be included in the conference server (130). In one or more embodiments, the conference manager (130) further includes a document access detector (134), a conference access manager (135), and an audio presence controller (136). In one or more embodiments, the repository (121) stores one or more community documents (122, 123), a conference code module (125), and a document access configuration record (124). In one or more embodiments, the community documents may by a project document shared by project members, a photo album shared by members of social networking contact list members, or other types of information shared by certain group members. In such embodiments, the community documents are shared based on access privilege status, for example assigned to each member by an administrator or owner of the community.

In one or more embodiments of the invention, the conference client device (101) further includes a community document browser (114), a microphone (102), a speaker (103), a display (104), an echo canceller (105), and a conference code module instance (109), which includes an audio codec (106), an audio client (107), and a conference controller (108). Although not specifically shown in FIG. 1, the conference client device (111) may include essentially the same type of components included in the conference client device (101) as described above.

In one or more embodiments of the invention, the data network (110) is a packet switched network such as an intranet maintained by an organization or the Internet that is open to the public. Generally speaking, the telephone network (115) may be the PSTN, a mobile phone network, a private telephone network, or combinations thereof. The telephone (112) may be an analog telephone, a digital telephone, a mobile phone, or any other telephone compatible with the telephone network (115). In one or more embodiments, the data network (110) and the telephone network (115) are coupled via an access gateway (not shown).

In one or more embodiments of the invention, the community document browser (114) in the conference client device (101) is configured to, using a data transmission protocol (e.g., HTTP) via the data network (110) (e.g., the Internet), send a request (not shown) to the conference server device (120) for accessing one or more community documents (e.g., 122). Specifically, the request may be sent to the community document server (141) (e.g., a Web server) in the conference server device (120) (e.g., a Web server device) in accordance with embodiments of the invention.

In one or more embodiments of the invention, the community document (122) (e.g., a Web page) is associated with the community (101b) in which the user (101a) of the conference client device (101) participates. In one or more embodiments, the conference client device (101) is configured to allow the user (101a) to access the community document (122) based on access privilege status assigned by an owner or administrator (not shown) of the community (101b). For example, the access privilege status may allow the user (101a) to request limited or unlimited access to the community document (122), which may include hyperlinks to other related documents. The user (101a), when assigned limited access privilege status, may be allowed to access a portion of the community document (122) related to a role of the user (101a) in the community (101b). In one or more embodiments, the document access configuration record (124) is configured to store access privilege status of one or more users (e.g., 101a, 111a) for accessing the community documents (122, 123) and may be implemented in various formats such as a table, a list, a file, a database, or other suitable data structures.

In one or more embodiments of the invention, the community document server (141) is configured to receive and authenticate the aforementioned request from the conference client device (101) to generate an access approval for the user (101a) based on the access privilege status of the user (101a). In one or more embodiments, based on the access approval, the community document server (141) is configured to provide the requested community document (122) to the conference client device (101) using the aforementioned data transmission protocol via the data network (110). On the contrary, if the aforementioned request is denied due to failure to be authenticated, the community document server (141) is configured to not provide the requested community document (122) to the conference client device (101).

In one or more embodiments of the invention, and as described above with respect to the user (101a), the user (111a) also participates in the community (101b). In a similar manner as described above, the community document server (141) is further configured to provide, using the aforementioned data transmission protocol via the data network (110), the community document (122) to the conference client device (111) based on an access approval granted to the user (111a) of the conference client device (111). In one or more embodiments of the invention, the access approval granted to the user (111a) of the conference client device (111) is based on the access privilege status of the user (111a) responsive to receiving a request from the conference client device (111) to access the community document (122).

In one or more embodiments of the invention, the conference manager (130) is configured to conduct and manage a conference call based on functionalities configured in one or more of the document access detector (134), the conference access manager (135), and the audio presence controller (136). The details are described below.

In one or more embodiments of the invention, the document access detector (134) is configured to detect the condition that two or more community members (e.g., 101a, 111a) participating in the same community (e.g., 101b) are accessing a community document (e.g., 122) at the same time. For example, the document access detector (134) may obtain request and authentication information from the community document server (141) to detect such a condition.

In one or more embodiments of the invention, when such a condition is detected, audio channels (not shown) are automatically established between the audio server (131) of the conference server device (120) and the audio client (e.g., 107) of the respective conference client devices (e.g., 101, 111) to enable remote collaborative audio interactions among the two or more community members (e.g., 101a, 111a). Such remote collaborative audio interactions is referred to as the Web guided conference call.

In one or more embodiments of the invention, the conference access manager (135) is configured to determine the respective access privilege (e.g., a listening only privilege, a listening/speaking privilege, selective privileges to participate in different portions of the conference call, etc.) of the users (101*a*, 111*a*) participating in the conference call. For example, the conference access manager (135) may obtain authentication and access approval information from the community document server (141) to make such a determination. In one or more embodiments of the invention, the access privilege status of the users (101*a*, 111*a*), assigned based on respective roles of the users (101*a*, 111*a*) in the community (101*b*), not only determines the respective portion of the community document (122) that the users (101*a*, 111*a*) are allowed to access, but is also relied upon by the conference manager (130) to manage user participation in the conference call. Additional functionalities of the conference manager (130) based on the audio presence controller (136) are described later.

In one or more embodiments of the invention, the audio server (131) (e.g., VoIP server) is configured, using a voice over data protocol (e.g., VoIP) via the data network (110), to receive user audio data streams from, and selectively dispatch a user specific conference audio data stream to, the conference client devices (101, 111). In one or more embodiments of the invention, these audio data streams are received and dispatched according to the respective access privilege of the users (101*a*, 111*a*) which is determined by the conference access manager (135), based on the access approval generated by the community document server (141). For example, the user (101*a*) may have a listening/speaking privilege in the conference call when assigned a full access approval to the community document (122) while the user (111*a*) may have a listening only privilege in the conference call when assigned a limited access approval to the community document (122).

In one or more embodiments of the invention, the audio mixer (132) is configured to selectively generate the user specific conference audio data stream to be dispatched by the audio server (131). In one or more embodiments of the invention, the user audio data stream may not be sent from the conference client device (111) if the user (111*a*) is assigned a listening only privilege in the conference call. Otherwise, the user audio data stream from the conference client device (111) may be excluded from the user specific conference audio data stream by the audio mixer (132) if the user (111*a*) is assigned a listening only privilege in the conference call. In one or more embodiments of the invention, the audio mixer (132) is configured to generate different versions of the user specific conference audio data stream for different users. For example, the user audio data stream received from a "calling" conference client device (e.g., 101), and the effects thereof, are substantially excluded in the user specific conference audio data stream sent to the same conference client device (e.g., 101) to reduce undesirable audio artifacts.

Returning to the discussion of the conference client device (101), in one or more embodiments of the invention, the display (104) is configured to display the community document (e.g., 122) provided by the community document server (141) as described above. In addition, the microphone (102) is configured to capture a user audio signal of the user (101*a*) while the audio codec (106) is configured to convert the user audio signal into the user audio data stream to be sent to the audio server (131) during the conference call as well as to convert the user specific conference audio data stream received from the audio server (131) into a conference audio signal. In one or more embodiments of the invention, the user audio data stream is packetized by the audio client (107) before being sent to the audio server (131). Furthermore, the speaker (103) is configured to produce an audio sound output based on the conference audio signal.

As described above, an echo problem exists in communication scenarios where there is a speaker and a microphone. In one or more embodiments of the invention, the echo canceller (105) is configured to condition the user audio data stream sent to the audio server (131) by reducing an effect of the audio sound output produced by the speaker (103) on the user audio signal captured by the microphone (102). In one or more embodiments, the echo canceller (106) may be included in system software (not shown) of the conference client device (101) that controls hardware devices such as the microphone (102), speaker (103), and display (104). For example, the system software may include Java® (Java is a registered trademark of Sun Microsystems, Inc., Santa Clara, Calif.) based software code.

In one or more embodiments of the invention, the conference code module (125) includes software code (e.g., Java® based software code such as an applet) that is configured to expand a Web client device into a conference client device (e.g., 101) with conference call capabilities in accordance with embodiments of the invention. In one or more embodiments, the download manager (142) is configured to download an instance of the conference code module (125) to the conference client devices (101, 111), which receive the instance as the conference code module instance (e.g., 109). For example, the download manager (142) may be a software component known to those skilled in the art to provide document download capabilities.

In one or more embodiments of the invention, the audio codec (106), the audio client (107), and the conference controller (108) are included in the conference client device (101) as built-in functionalities. In one or more embodiments of the invention, at least a portion of the audio codec (106), the audio client (107), and the conference controller (108) are implemented based on the conference code module instance (109) downloaded from the conference server device (120).

In one or more embodiments of the invention, the community document browser (114) is further configured to receive and install the downloaded conference code module instance (109) in the conference client device (101). In one or more embodiments, the aforementioned audio codec (106) and the audio client (107) are implemented based on the conference code module instance (109). For example, the conference code module instance (109) may include instructions for execution by a processor (not shown) of the conference client device (101). Further, the processor executing the instructions may include functionalities to receive the user specific conference audio data stream from the audio server (131) using the voice over data protocol via the data network (110) and convert the user specific conference audio data stream into the conference audio signal, as well as functionalities to convert the user audio signal into the user audio data stream and send the user audio data stream to the audio server (131) of the conference server device (120) using the voice over data protocol via the data network (110).

In one or more embodiments of the invention, the conference controller (108), whether a built-in functionality or implemented based on the downloaded conference code module instance (109), is configured to receive conference management information from the conference server device (120), to identify a voice (e.g., of the user (111*a*)) in the conference audio signal to be associated with a source (e.g., conference client device (111)) of the voice based on the conference management information, and to initiate an out-of-band communication channel to the identified conference client device (e.g., 111) based on the voice. For example, the conference management information may include identities of all conference client devices contributing to the user specific conference audio data stream at any time as observed from the audio server (131) and/or the audio mixer (132) of the conference server device (120). Accordingly, identities of current speaking users may be received and organized by the conference controller (108) and displayed using the display (104) such that the user (101a) may recognize who are all speaking at any given time during a conversation in the conference call. Furthermore, the conference controller (108) may be further configured to include speech to text functionality such that a pre-determined symbol representing a current dominant speaker may be displayed next to text converted from a dominant voice in the conversation of the conference call in real time. With the benefit of such correlation between a distinct voice in the conversation and the source of such voice, the user (101a) may initiate a private conversation with the speaker of such voice using an out-of-band communication channel established by the conference controller (108) separate from the audio channel carrying the user specific conference audio data stream. Examples of such out-of-band communication channel may include a text chat window, a private VoIP channel, an email, a text message, etc.

In one or more embodiments of the invention, the audio presence controller (136) is configured to manage an audio presence of the conference call. Specifically, the audio presence may include a computer generated audio for providing a background sound (e.g., music), signaling a pre-determined event (e.g., an event significant to the community (101b), a timer event from a real-time clock, an event related to a particular user behavior in the conference call such as excessive argument, etc.), representing other related activities (e.g., another ongoing conference call initiated based on another community document (e.g., 123)), or providing other appropriate pre-determined audio ambiances. In one or more embodiments of the invention, various components of the audio presence at the conference client device (101) may be selectively enabled or disabled by the user (e.g., 101a).

In one or more embodiments, the supplemental audio generator (133) is configured to generate a supplemental audio data stream responsive to an instruction from the audio presence controller (136). For example, the supplemental audio data stream may be generated for further generating the background music or particular sound pattern representing one of the aforementioned pre-determined events. Accordingly, the audio mixer (132) is further configured to selectively include the supplemental audio data stream in the user specific conference audio data stream based on the instruction.

From time to time, there may be more than one conference call being conducted at any single time. For example, another conference call initiated based on two or more users accessing the community document (123) associated with another community may overlap the conference call associated with the community (101b) when both users (101a, 111a) are accessing the community document (122). In one or more embodiments of the invention, the audio presence controller (136) is further configured to determine a sound level based on which to allow a conference call conversation to be overheard by users of another conference call. In one or more embodiments of the invention, the sound level is user specific based on applicable access privilege status of an individual user to the overheard conference call. For example, the user specific conference audio data stream of one conference call may be selectively injected into the user specific conference audio data stream of another conference call. In an example scenario, the user (101a) may be able to overhear, with sufficiently clarity as a background conversation, the conversation of the conference call associated with the community document (123) if the user (101a) also participates in the community of the community document (123), while the user (111a) may only overhear an indistinct sound if the user (111a) does not participate in the community of the community document (123).

Accordingly, in one or more embodiments of the invention, the audio mixer (132) is further configured to selectively include an effect of another conference call in the user specific conference audio data stream, responsive to the instruction from the audio presence controller (136), based on the sound level described in the above example.

In one or more embodiments of the invention, the conference management information may include an identity of the other conference call (e.g., identifying the community document (123) or the associated community) when the effect of the other conference call is included by the audio mixer (132). In one or more embodiments of the invention, the conference controller (108) is configured to receive such conference management information and identify a sound in the conference audio signal to be associated with the effect of the other conference call based on such conference management information. For example, the user (101a) not only can hear, with sufficient clarity as a background conversation, the other conference call, but also see that the overheard conference call is associated with the community document (123) in which the user (101a) also participates.

In one or more embodiments of the invention, a special telephone number is provided by the conference server device to access the audio server (131) using the telephone (112) via the telephone network (115). In such an embodiment of the invention, the user (113), who may not have access to a conference client device, may still call in to the Web guided conference call without the benefit of Web guided features.

Figure 2A:
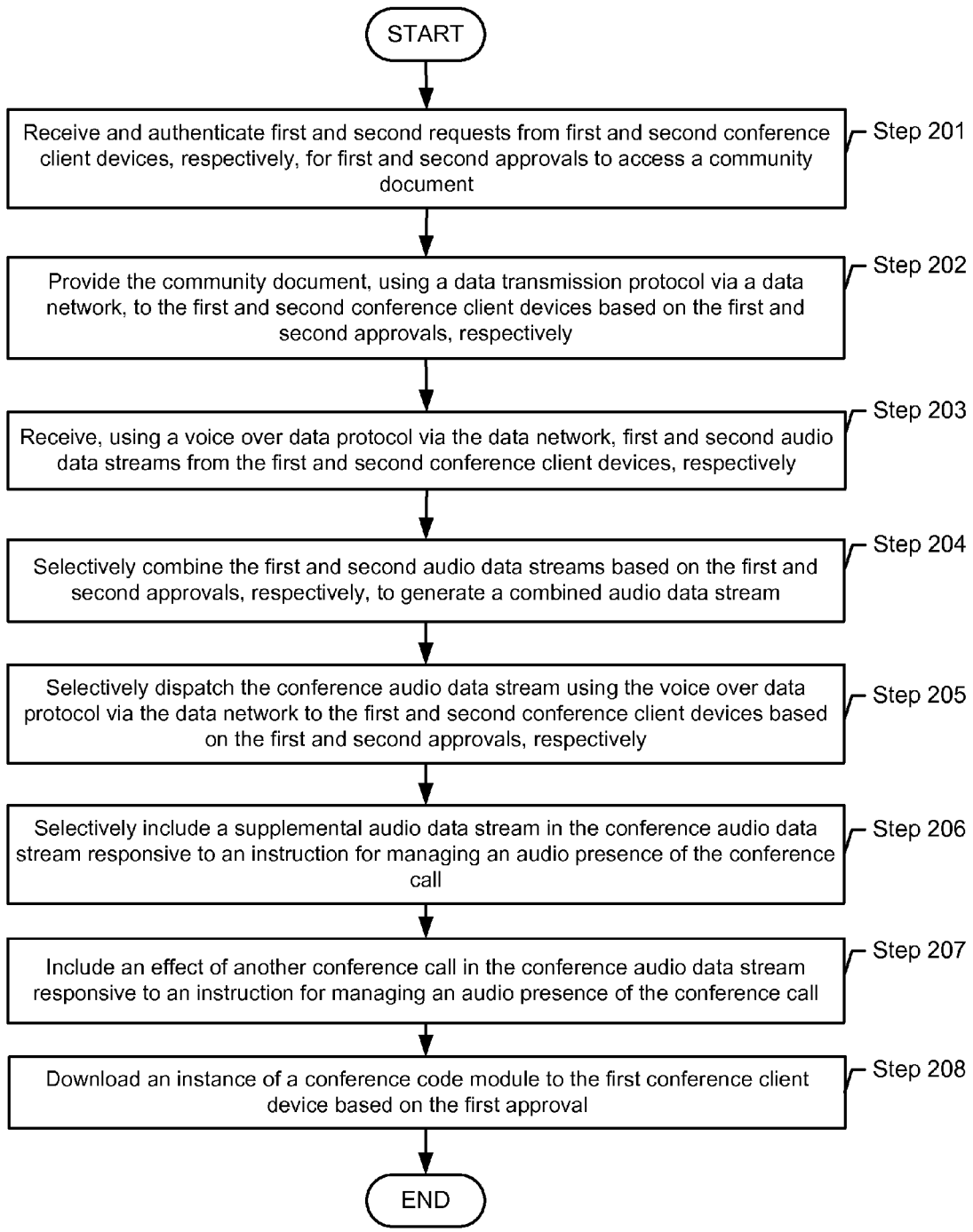
FIGS. 2A and 2B depict a flowchart of a method in accordance with one or more embodiments of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A.

In one or more embodiments of the invention, the method depicted in FIG. 2A may be practiced using system (100) described with respect to FIG. 1 above. In particular, a conference server device depicted in FIG. 1 may be used for conducting a conference call based on a network accessible community document in accordance with embodiments of the invention.

In Step 201, a first request from a first conference client device (e.g., (101) of FIG. 1) for a first approval is received and authenticated and a second request from a second conference client device (e.g., (111) of FIG. 1) for a second approval is received and authenticated. In one or more embodiments, the first request and the second request are received and authenticated by a conference server device (e.g., (120) of FIG. 1) for access to a community document (e.g., a Web page associated with a community) by the first conference client device and the second conference client device, respectively.

For example, the first and second conference client devices may be Web client devices enabled with VoIP functionalities while the conference server device may be a Web server devices including a VoIP server. In addition, the first conference client device may be used by a first user whose request for the first approval to access the community document is authenticated based on a first access privilege status of the first user, for example based on a role of the first user's participation in the community associated with the community document. In a similar manner, the second conference client device may be used by a second user whose request for the second approval to access the community document is authenticated based on a second access privilege status of the second user, for example based on a role of the second user's participation in the community associated with the community document.

In one or more embodiments of the invention, the access privilege status of the first and second users not only determine the respective portion of the community document that the first and second users are allowed to access, but also determine the access privilege of the first and second users in participating in a conference call that is initiated when two or more authorized users are accessing the community document simultaneously. Such a conference call is referred to as a Web guided conference call. For example, the access privilege of user participation in the Web guided conference call may include a listening only privilege, a listening/speaking privilege, other selective privileges to participate in different portions of the conference call, etc. Other specifics of initiating and managing the Web guided conference call are described in more detail later.

In Step 202, the community document is provided, using a data transmission protocol (e.g., HTTP) via a data network (e.g., the Internet), to the first conference client device and the second conference client device based on the first approval and the second approval, respectively. As discussed above, the community document may be a Web page associated with the community that may be browsed and accessed based on authentication processes, for example requiring a user name, password, or other user credentials.

In Step 203, a first user audio data stream and a second user audio data stream from the first conference client device and the second conference client device, respectively, may be received by the conference server device using a voice over data protocol (e.g., VoIP) via the data network. In one or more embodiments of the invention, the first and second user audio data streams may be generated and sent using respective microphones, codec's, and audio servers of the first and second conference client devices, respectively. More details of the conference client device method are described in reference to FIG. 2B below.

In Step 204, the first user audio data stream and the second user audio data stream may be selectively included based on the first approval and the second approval to generate a user specific conference audio data stream. As discussed above, the access approvals for the first and second users to access respective authorized portions of the community document based on individual user's role in the community determines the access privilege of the first and second users in participating in the Web guided conference call. For example, both the first and second user audio data streams are used in generating the user specific conference audio data stream if both the first and second users are assigned listening/speaking privilege in the Web guided conference call, whereas either the first or the second user audio data stream is not used (e.g., not received in Step 203 or received but excluded in Step 204) in generating the user specific conference audio data stream if the corresponding user is assigned listening only privilege. In one or more embodiments of the invention, different versions of the user specific conference audio data stream are generated for different users. For example, the user audio data stream received from a "calling" conference client device, and the effects thereof, are substantially excluded in the user specific conference call audio data stream sent to the same conference client to reduce undesirable audio artifacts.

In Step 205, the user specific conference audio data stream may be selectively dispatched, using the voice over data protocol via the data network, to the first conference client device and the second conference client device based on the first approval and the second approval, respectively. For example, the user specific conference audio data stream may be dispatched to the first user in its entirety if the first user is assigned full access to the community document, whereas the user specific conference audio data stream may be dispatched to the second user selectively (e.g., during a selected time period) if the second user is assigned limited access to a portion of the community document associated with a selective privilege to participate in a corresponding portion of the conference call.

In Step 206, a supplemental audio data stream may be selectively generated and included in the user specific conference audio data stream responsive to an instruction for managing an audio presence of the conference call. For example, the audio presence may include a computer generated audio for providing a background sound (e.g., music), signaling a pre-determined event (e.g., an event significant to the community (101b), a timer event from a real-time clock, an event related to a particular user behavior in the conference call such as excessive argument, etc.), representing other related activities (e.g., another ongoing conference call initiated based on another community document (e.g., 123)), or providing other appropriate pre-determined audio ambiances. In one or more embodiments of the invention, the supplemental audio data stream may be generated for further generating the background music or particular sound pattern representing one of the aforementioned pre-determined events. In one or more embodiments of the invention, various components of the audio presence at the conference client device may be selectively enabled or disabled by the user.

In Step 207, an effect of another conference call may be included in the user specific conference audio data stream responsive to an instruction for managing the audio presence of the conference call. In one or more embodiments of the invention, the other conference call is based on another community document, while the effect of the other conference call is determined based on a third access privilege status of the first user for accessing the other community document. For example, the first user may be able to overhear, with sufficiently clarity as a background conversation, the conversation of the other conference call if the first user also participates in another community associated with the other conference call, while the second user may only overhear indistinct sound if the second user does not participate in the other community associated with the other conference call.

In one or more embodiments of the invention, the VoIP functionalities are included in the first conference client device as built-in functionalities. In one or more embodiments of the invention, at least a portion of the VoIP functionalities are implemented based on software code downloaded from the conference server device. In Step 208, an instance of a conference code module stored in the conference server device may be downloaded to the first conference client device based on the first approval. For example, the instance of the conference code module may include instructions for execution by a processor of the first conference client device causing the first conference client device to send the first user audio data stream to and receive the user specific conference audio data stream from the conference server device using the voice over data protocol via the data network.

Figure 2B:
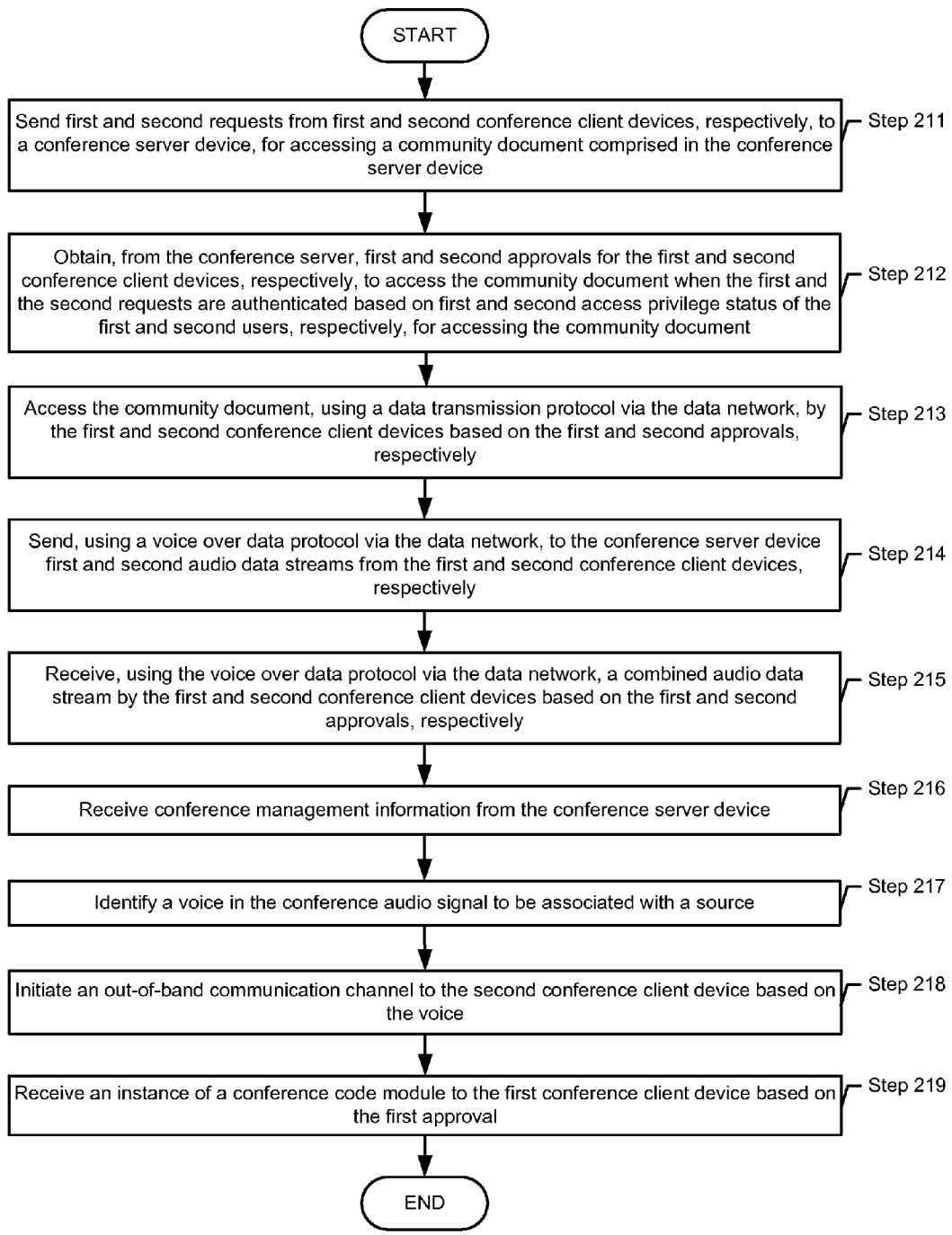

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B.

In one or more embodiments of the invention, the method depicted in FIG. 2B may be practiced using system (100) described with respect to FIG. 1 above. In particular, two or more conference client devices depicted in FIG. 1 may be used for receiving a conference call based on a network accessible community document in accordance with embodiments of the invention.

In Step 211, a first request may be sent from a first conference client device (e.g., (101) of FIG. 1) and a second request may be sent from a second conference client device (e.g., (111) of FIG. 1), respectively, to a conference server device (e.g., (120) of FIG. 1). In one or more embodiments of the invention, the first request and the second request are for access to a community document (e.g., a Web page associated with a community) stored in the conference server device.

Similar to an example scenario depicted in FIG. 2A, the first and second conference client devices may be Web client devices enabled with VoIP functionalities while the conference server device may be a Web server device including a VoIP server. In addition, the first conference client device may be used by a first user whose request for a first approval to access the community document is authenticated based on a first access privilege status of the first user, for example based on a role of the first user's participation in the community associated with the community document. In a similar manner, the second conference client device may be used by a second user whose request for the second approval to access the community document is authenticated based on a second access privilege status of the second user, for example based on a role of the second user's participation in the community associated with the community document.

Accordingly, in Step 212, a first approval is obtained from the conference server device for the first conference client device and a second approval is obtained from the conference server device for the second conference client device, respectively.

In Step 213, the community document may be accessed, using a data transmission protocol (e.g., HTTP) via a data network (e.g., the Internet), by the first conference client device based on the first approval and the second conference client device based on the second approval, respectively. As discussed above, the community document may be a Web page associated with the community that may be browsed and accessed based on authentication processes, for example requiring a user name, password, or other user credentials. In addition, the community document may be displayed, for example at the first conference client device once the first approval is granted.

In Step 214, first and second user audio data streams may be sent from the first and the second conference client devices, respectively, using a voice over data protocol (e.g., VoIP) via the data network, to the conference server device. In one or more embodiments of the invention, the first and second user audio data streams may be generated and sent using respective microphones, codec's, and audio servers of the first and second conference client devices, respectively. For example, a user audio signal of the first user of the first conference client device may be captured and converted into the first user audio data stream using a microphone and a codec included in the first conference client device. In one or more embodiments of the invention, either the first or the second user audio data stream may not be generated and sent if the first or the second user is assigned a listening only privilege for the particular conference call.

In Step 215, a user specific conference audio data stream may be received, using the voice over data protocol via the data network, by the first conference client device and the second conference client device based on the first approval and the second approval, respectively. In one or more embodiments of the invention, the user specific conference audio data stream is received from the conference server device that selectively includes the first user audio data stream and the second user audio data stream based on the first approval and the second approval to generate the user specific conference audio data stream. The details of selectively generating user specific conference audio data streams based on the approvals to access requests are similar to that which has been described in reference to FIG. 2A above. In addition, the user specific conference audio data stream may be converted into a conference audio signal at the first conference client device to produce an audio sound output, for example using the codec and a speaker of the first conference client device. Furthermore, the first user audio data stream may be conditioned by reducing at least an effect from the audio sound output of the conference audio signal using an echo canceller before the first user audio data stream is sent to the conference server device.

In Step 216, conference management information may be received from the conference server device, for example by the first conference client device. In one or more embodiments of the invention, the conference management information may include identities of all conference client devices contributing to the user specific conference audio data stream at any time as compiled by the conference server device. Accordingly, identities of current speaking users may be displayed on the first conference client device such that the first user may recognize who are all speaking during a conversation in the conference call (Step 217). Furthermore, the user specific conference audio data stream may be processed using a speech to text functionality such that a pre-determined symbol representing a current dominant speaker may be displayed next to text converted from a dominant voice in the conversation of the conference call in real time.

As discussed above, from time to time, there may be more than one conference call being conducted at any single time and a conference call conversation may be allowed to be overheard by users of another conference call. In the example scenario described in reference to FIG. 1 above, the first user may be able to overhear, with sufficiently clarity as a background conversation, the conversation of the other conference call if the first user also participates in another community associated with the other conference call, while the second user may only overhear indistinct sound if the second user does not participate in the community associated with the other conference call.

In one or more embodiments of the invention, the conference management information may include identities of all ongoing conference calls as compiled by the conference server device. Accordingly, identities of other conference calls or participating users may be displayed on the first conference client device such that the first user may recognize sources of overheard voices coming from other conference calls (Step 217).

With the benefit of such correlation between a distinct voice in the conversation and the source of such a voice, an out-of-band communication channel, separate from the audio channel carrying the user specific conference audio data stream, may be initiated by the first user to conduct a private conversation with the speaker of such a voice (Step 218). Examples of such out-of-band communication channel may include a text chat window, a private VoIP channel, an email, a text message, etc.

As discussed in reference to FIG. 2A above, in one or more embodiments of the invention, at least a portion of the VoIP functionalities in the first conference client device are implemented based on software code downloaded from the conference server device. In Step 218, an instance of a conference code module stored in the conference server device may be received by the first conference client device based on the first approval. For example, the instance of the conference code module may include instructions for execution by a processor of the first conference client device causing the first conference client device to convert a microphone captured user audio signal into the first user audio data stream, to send the first user audio data stream using the voice over data protocol via the data network to the conference server device, to receive the user specific conference audio data stream from the conference server device, and to convert the user specific conference audio data stream into the conference audio signal from which a conference audio output is generated.

Figure 3:
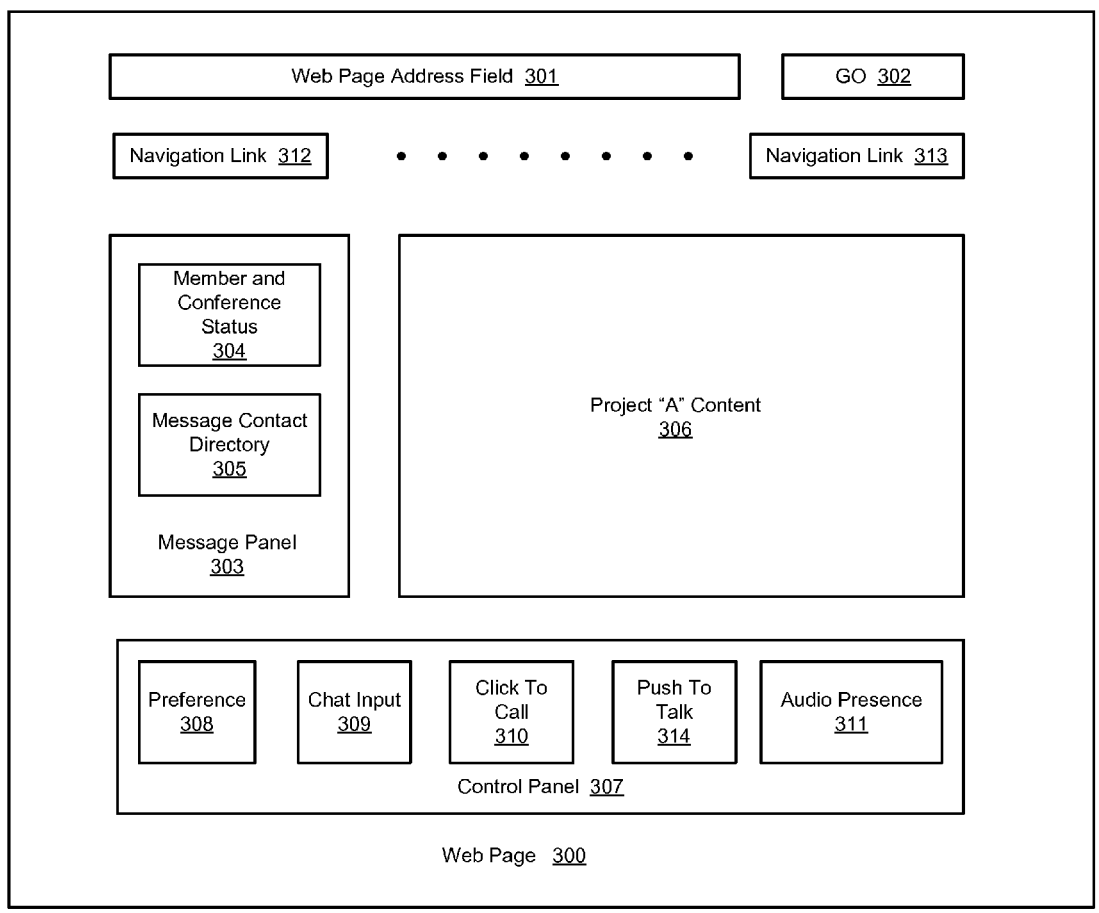
FIG. 3 depicts an example in accordance with one or more embodiments of the invention.

FIG. 3 depicts a diagram showing a Web page (300) as an example use case in accordance with one or more embodiments of the invention.

In accordance with one or more embodiments of the invention, a conference call is conducted (e.g., initiated and managed) among members of one or more communities using a Web site (i.e., conference Web site) whose page context implies an audio interaction setting. For example, the communities may include project teams each having Web pages accessible to respective project team members. In such example, the conference Web site may contain projects, activities, members, and Web pages. Various portions of the Web site contents may be simultaneously accessed by members of various projects based on a hierarchical project membership structure with associated layered project content access privilege assignments, which together define the Web site context. Whenever two or more members of the conference Web site are looking at the same project (e.g., project "A") or engaged in the same Web activity (e.g., by accessing a pre-determined Web page such as the Web page (300)), an audio conference is implied whose topic is the activity or project implied by the Web page context. Such audio conference is referred to as the Web guided conference call as similarly described in reference to FIGS. 1, 2A, and 2B above.

In an example scenario, the conference Web site also contains a Java® (Java is a registered trademark of Sun Microsystems, Inc., Santa Clara, Calif.) applet that incorporates a two way VoIP capability, which is downloaded to the user's browser as part of the Web page content, and a VoIP server which can mix audio between (or among) arbitrary VoIP applets. No special hardware is required, just the Web browser, a speaker, and a microphone. When a Web page (e.g., 300) is displayed to the user, the page also contains configuration information the applet uses to connect to the VoIP server and set the audio context (e.g., audio access privilege information, audio presence information, etc.) of the Web page (e.g., 300).

As shown in FIG. 3, when a user navigates to the project "A" content (306) on the Web page (300) of the conference Web site by typing in a Universal Resource Locator (URL) in the web page address field (301) and activating the GO button (302), the user is automatically placed in an audio conference with all other project "A" members who are also viewing the project "A" content (306). In addition, the Web page (300) includes navigational links (312, 313, etc.). For example, the navigational link (312) may lead to other related contents to the project "A" content (306) in the same project "A", while the navigation link (313) may lead to content related to another project "B".

When the user navigates to another project content by either typing in another URL in the web page access field (301) or by activating the navigational link (313), the user may be removed from the project "A" conference and added to another ongoing project "B" conference already participated by other members of the project "B".

The routing of a user through various audio spaces of conference calls with associated audio presences can be controlled either by the audio context of the Web page, the user, or a combination of both. For example, the user control may be asserted using the settings of preference (308) and/or the audio presence (311) in the control panel (307) of the Web page (300). Depending on the contextual audio access privilege information or user control, the audio may be bidirectional, or one way (e.g. based on limited access privilege status or muted by the user).

In addition, the hierarchical project membership structure, with associated layered project content access privilege assignments, allows an entire conference to be treated as an individual user and be added to or removed from other conferences. Thus conferences may be aggregated, based on participating members' positions in the hierarchical project membership structure, into larger conferences as implied by the Web site context. Furthermore, the audio gain (accordingly, the sound level) of any individual member or conference, in either direction, may be independently adjusted. For example, the identities and associated sound level of individual members or conferences may be displayed using the member and conference status (304) in the message panel (303) of the Web page (300).

This allows a conference participant (e.g., member of project "A") to "hear" activity on "nearby" pages (e.g., associated with project "B"), perhaps encouraging members of project "A" participating in one conference to navigate to those pages associated with project "B", thus increasing the level of collaboration among related projects.

In addition to the audio spaces whose members and properties are defined by the Web page context, each page (e.g., 300) may have an integrated messaging capability (in addition to ordinary Instant Messaging and chat messaging) provided based on the message contact directory (305), the chat input window (309), the click to call button (310), and the push to talk button (314). For example, the message contact directory (305) may be displayed dynamically according to identified voices of the speaking members or other ongoing conferences displayed in the member and conference status (304) for informing the conference participants as to the state of the audio spaces they currently occupy. Based on user setting in the preference (308), contact information of silent members or inactive conferences may be hidden, separately grouped, or otherwise distinguished from the speaking members or ongoing conferences. In addition, the chat input window (309) and the click to call button (310) provide an out-of-band communication channel for conducting private conversation, for example with other conference participants showing up in the dynamic message contact directory (305).

In some cases where the echo canceller (e.g., (105) of FIG. 1) is not available, there might be situations where echo created by that participant might be significant enough to degrade the audio quality of the conference. The participant without the echo canceller could be set to "listen only" mode so their non-cancelled echo does not disrupt the call. The push to talk button (314) would allow the participant without echo cancellation capabilities to easily alternate between "listen only" and "talk only" modes in the same way as how a walki-talkie or CB radio works.

In addition to actual people, the audio spaces of conference calls with associated audio presences may be inhabited by computer "avatars". These avatars can be used to provide additional audio context to the space for the benefit of the human participants. Examples include project specific "background music" that plays during quiet periods when no one is speaking, or signals or sound patterns that alert the participants about events relevant to a project, such as a bug fixed or a software build failed. If speech recognition is available, users may speak to the computer avatars, which can help with the conference Web site navigation for example to search materials and/or conferences relevant to various projects of the conference Web site.

Further, although FIGS. 1-3 describe the Web guided conference call based on audio communication, it is also contemplated that video communication may also be supported in the Web guided conference call, for example by substituting and/or expanding audio functionalities described in various system components and/or method steps to provide appropriate video functionalities.

Figure 4:
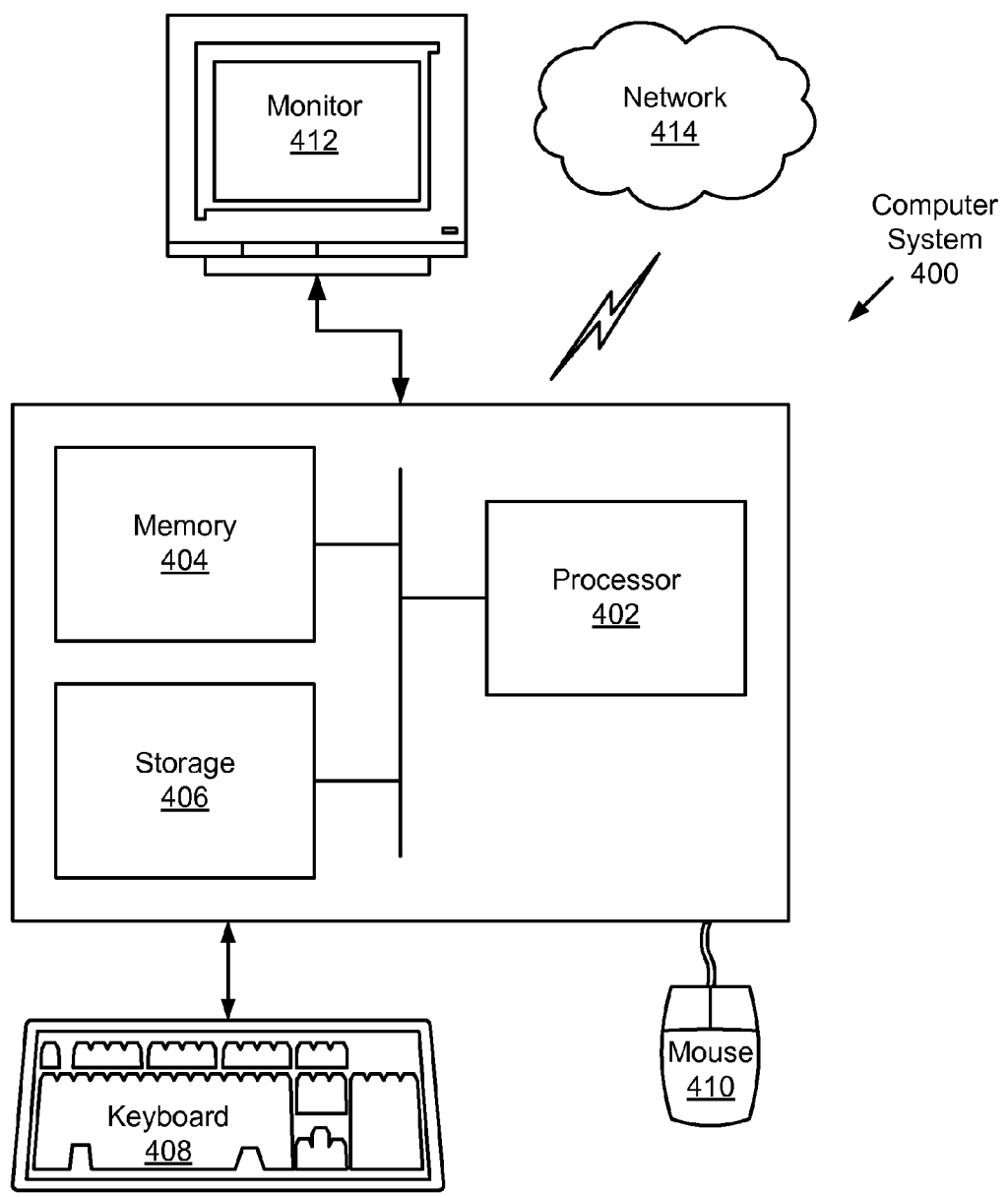
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a speaker (not shown, a monitor (412) (e.g., a liquid crystal display (LCD), a plasma display, and/or cathode ray tube (CRT) monitor). The computer system (400) may be connected to a network (414) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network (414). Further, embodiments of the invention may be implemented on a distributed system having a plurality of nodes, where each portion of the invention (e.g., various modules of FIG. 1 such as the document access detector (134), the community document server (141), etc.) may be located on a different node within the distributed system. In one or more embodiments of the invention, the node corresponds to a computer system. Alternatively, the node may correspond to a processor with associated physical memory. The node may also alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for conducting a conference call based on a community document, comprising:
    a data network;
    a first conference client device and a second conference client device communicatively coupled to the data network, wherein the first conference client device is associated with a first user of the conference call and the second conference client device is associated with a second user of the conference call; and
    a conference server device communicatively coupled to the data network, comprising:
        a repository storing the community document and a document access configuration record, wherein the document access configuration record comprises a first access privilege status of the first user and a second access privilege status of the second user, respectively, for accessing the community document;
        a community document server configured to provide, using a data transmission protocol via the data network, the community document to the first conference client device based on a first approval and to the second conference client device based on a second approval, respectively, wherein the community document is provided responsive to the community document server receiving a first request from the first conference client device and a second request from the second conference client device, respectively, to access the community document;
        an audio module configured to automatically establish, in response to the first conference client device and the second conference client device accessing the community document concurrently, an audio channel between the first conference client device and the second conference client device to initiate a web guided conference call, the audio module comprising:
            an audio server configured to receive, using a voice over data protocol via the data network, a first user audio data stream from the first conference client device and a second user audio data stream from the second conference client device, respectively, wherein the audio server is further configured to selectively dispatch, using the voice over data protocol via the data network, a user specific conference audio data stream to the first conference client device based on the first approval and to the second conference client device based on the second approval, respectively, and
            an audio mixer configured to selectively generate the user specific conference audio data stream from the first user audio data stream and the second user audio data stream based on the first approval and the second approval; and
        a processor and memory storing instructions when executed by the processor, comprising functionalities to:
            receive and authenticate the first request from the first conference client device to generate the first approval, wherein the first request is authenticated based on the first access privilege status, and receive and authenticate the second request from the second conference client device to generate the second approval, wherein the second request is authenticated based on the second access privilege status.

2. The system of claim 1, wherein the first approval is associated with one of a listening only privilege and a listening/speaking privilege based on the first access privilege status.

3. The system of claim 1, wherein the first conference client device comprises:
- a community document browser configured to, using the data transmission protocol via the data network, send the first request to the conference server device and receive the community document from the conference server device;
- a display for displaying the community document;
- an audio client configured to receive the user specific conference audio data stream using the voice over data protocol via the data network;
- an audio coder/decoder (codec) configured to convert the user specific conference audio data stream into a conference audio signal;
- a speaker for producing an audio sound output based on the conference audio signal;
- a microphone for capturing a user audio signal of the first user, wherein the audio codec is further configured to convert the user audio signal into the first user audio data stream, wherein the audio client is further configured to send the first user audio data stream to the conference server device using the voice over data protocol via the data network; and
- an echo canceller configured to condition the first user audio data stream by reducing an effect from the audio sound output of the conference audio signal.

4. The system of claim 3,
wherein the repository further stores an audio codec module and conference controller code module,
wherein the conference server device further comprises a download manager configured to download an instance of the audio codec module and conference controller code module to the first conference client device,
wherein the community document browser is further configured to receive the instance of the audio codec module and conference controller code module,
wherein the audio codec and the audio client are implemented based on the instance of the audio codec module and conference controller code module,
wherein the audio codec module and conference controller code module comprises instructions when executed by a processor of the first conference client device comprising functionalities to:
- receive the user specific conference audio data stream using the voice over data protocol via the data network,
- convert the user specific conference audio data stream into the conference audio signal,
- convert the user audio signal into the first user audio data stream, and
- send the first user audio data stream to the conference server device using the voice over data protocol via the data network.

5. The system of claim 3, wherein the first conference client device further comprises a conference controller configured to:

receive conference management information from the conference server device;
identify a voice in the conference audio signal to be associated with the second user audio data stream based on the conference management information; and
initiate an out-of-band communication channel to the second conference client device based on the voice.

6. The system of claim 3,
wherein the conference server device further comprises an audio presence controller configured to manage an audio presence of the conference call,
wherein the audio mixer is further configured to include an effect of another conference call in the user specific conference audio data stream responsive to an instruction from the audio presence controller, wherein the another conference call is based on another community document, wherein the effect of the another conference call is determined based on a third access privilege status, comprised in the document access configuration record, of the first user for accessing the another community document,
wherein the first conference client device further comprises a conference controller configured to:
receive conference management information from the conference server device; and
identify a sound in the conference audio signal to be associated with the effect of the another conference call based on the conference management information.

7. The system of claim 1, wherein the conference server device further comprises:
- an audio presence controller configured to manage an audio presence of the conference call; and
- a supplemental audio generator configured to generate a supplemental audio data stream responsive to an instruction from the audio presence controller, and
wherein the audio mixer is further configured to selectively include the supplemental audio data stream in the user specific conference audio data stream based on the instruction.

8. The system of claim 1,
wherein the data network comprises Internet,
wherein the data transmission protocol comprises Hypertext Transfer Protocol (HTTP),
wherein the community document comprises a Web page, and
wherein the voice over data protocol comprises voice over Internet Protocol (VoIP).

9. A method for conducting a conference call based on a community document, comprising:
receiving and authenticating a first request from a first conference client device for a first approval and a second request from a second conference client device for a second approval, wherein the first request and the second request are for accessing a community document by the first conference client device and the second conference client device, respectively, wherein the first conference client device is associated with a first user of the conference call and the second conference client device is associated with a second user of the conference call;
providing the community document, using a data transmission protocol via a data network, to the first conference client device and the second conference client device based on the first approval and the second approval, respectively; and
automatically establishing, in response to the first conference client device and the second conference client device accessing the community document concurrently, an audio channel between the first conference client device and the second conference client device to initiate a web guided conference call, comprising:

receiving, using a voice over data protocol via the data network, a first user audio data stream and a second user audio data stream from the first conference client device and the second conference client device, respectively, selectively combining the first user audio data stream and the second user audio data stream based on the first approval and the second approval to generate a user specific conference audio data stream, and selectively dispatching the user specific conference audio data stream using the voice over data protocol via the data network to the first conference client device and the second conference client device based on the first approval and the second approval, respectively, wherein the first request and the second request are authenticated based on a first access privilege status of the first user and a second access privilege status of the second user, respectively, for accessing the community document.

10. The method of claim 9, wherein the first approval is associated with one of a listening only privilege and a listening/speaking privilege based on the first access privilege status.

11. The method of claim 9, further comprising:
generating a supplemental audio data stream responsive to an instruction for managing an audio presence of the conference call, and
selectively including the supplemental audio data stream in the user specific conference audio data stream based on the instruction.

12. The method of claim 9, further comprising:
including an effect of another conference call in the user specific conference audio data stream responsive to an instruction for managing an audio presence of the conference call,
wherein the another conference call is based on another community document, wherein the effect of the another conference call is determined based on a third access privilege status of the first user for accessing the another community document.

13. The method of claim 9, further comprising:
downloading an instance of an audio codec module and conference controller code module to the first conference client device based on the first approval,
wherein the instance of the audio codec module and conference controller code module comprises instructions when executed by a processor of the first conference client device causing the first conference client device to:
send the first user audio data stream using a voice over data protocol via the data network, and
receive the user specific conference audio data stream using the voice over data protocol via the data network.

14. The method of claim 9,
wherein the data network comprises Internet,
wherein the data transmission protocol comprises Hypertext Transfer Protocol (HTTP),
wherein the community document comprises a webpage, and
wherein the voice over data protocol comprises voice over Internet Protocol (VoIP).

15. A method for receiving a conference call based on a community document, comprising:

sending a first request from a first conference client device and a second request from a second conference client device, respectively, to a conference server device, wherein the first request and the second request are for accessing a community document comprised in the conference server device, wherein the first conference client device is associated with a first user of the conference call and the second conference client device is associated with a second user of the conference call;

obtaining, from the conference server, a first approval for the first conference client device and a second approval for the second conference client device, respectively, to access the community document when the first request and the second request are authenticated based on a first access privilege status of the first user and a second access privilege status of the second user, respectively, for accessing the community document;

accessing the community document, using a data transmission protocol via the data network, by the first conference client device based on the first approval and the second conference client device based on the second approval, respectively; and automatically establishing, in response to the first conference client device and the second conference client device accessing the community document concurrently, an audio channel between the first conference client device and the second conference client device to initiate a web guided conference call, comprising:

sending, using a voice over data protocol via the data network, to the conference server device a first user audio data stream from the first conference client device and a second user audio data stream from the second conference client device, respectively, and receiving, using the voice over data protocol via the data network, a user specific conference audio data stream by the first conference client device and the second conference client device based on the first approval and the second approval, respectively, wherein the user specific conference audio data stream is selectively generated by combining the first user audio data stream and the second user audio data stream at the conference server device based on the first approval and the second approval.

16. The method of claim 15, wherein the first approval is associated with one of a listening only privilege and a listening/speaking privilege based on the first access privilege status.

17. The method of claim 15, further comprising:
displaying the community document at the first conference client device;
converting the user specific conference audio data stream into a conference audio signal at the first conference client device and producing an audio sound output based on the conference audio signal;
capturing and converting a user audio signal of the first user at the first conference client device into the first user audio data stream; and
conditioning the first user audio data stream at the first conference client device by reducing an effect from the audio sound output of the conference audio signal.

18. The method of claim 15, further comprising:
receiving an instance of an audio codec module and conference controller code module from the conference server device based on the first approval, wherein the instance of the audio codec module and conference controller code module comprises instructions when executed by a processor of the first conference client device causing the first conference client device to:

receive the user specific conference audio data stream using the voice over data protocol via the data network, convert the user specific conference audio data stream into the conference audio signal, convert a user audio signal of the first user into the first user audio data stream, wherein the user audio signal is captured using a microphone of the first conference client device, and send the first user audio data stream to the conference server device using the voice over data protocol via the data network.

19. The method of claim 18, wherein the instructions when executed by the processor further cause the first conference client device to:

receive conference management information from the conference server device;

identify a voice in the conference audio signal to be associated with the second user audio data stream based on the conference management information; and initiate an out-of-band communication channel to the second conference client device based on the voice.

20. The method of claim 18, wherein the instructions when executed by the processor further cause the first conference client device to:

receive conference management information from the conference server device;

identify a sound in the conference audio signal to be associated with an effect of another conference call based on the conference management information;

wherein the another conference call is based on another community document, wherein the effect of the another conference call is determined based on a third access privilege status of the first user for accessing the another community document.

* * * * *